US006775296B1

(12) United States Patent
Kitamura

(10) Patent No.: US 6,775,296 B1
(45) Date of Patent: Aug. 10, 2004

(54) METHOD AND SYSTEM OF COMMUNICATING BY ESTABLISHING ONE VIRTUAL CONNECTION BETWEEN TERMINALS, A TERMINAL DEVICE, AND A PROTOCOL REPEATER/CONVERTER

(75) Inventor: Hiroshi Kitamura, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/417,735

(22) Filed: Oct. 14, 1999

(30) Foreign Application Priority Data

Oct. 15, 1998 (JP) .......................................... 10-293482

(51) Int. Cl.[7] ................................................ H04J 3/24
(52) U.S. Cl. ...................................................... 370/466
(58) Field of Search ............................... 370/464–467, 370/397, 399, 354, 353, 355, 474, 389, 392; 1/397, 399, 354, 353, 355

(56) References Cited

U.S. PATENT DOCUMENTS

| | | | | |
|---|---|---|---|---|
| 5,425,028 A | * | 6/1995 | Britton et al. | 370/389 |
| 5,568,487 A | * | 10/1996 | Sitbon et al. | 370/466 |
| 5,852,660 A | * | 12/1998 | Lindquist et al. | 379/230 |
| 6,078,583 A | * | 6/2000 | Takahara et al. | 370/356 |
| 6,157,647 A | * | 12/2000 | Husak | 370/401 |
| 6,259,706 B1 | * | 7/2001 | Shimada | 370/466 |
| 6,320,874 B1 | * | 11/2001 | Crump et al. | 370/466 |
| 6,389,023 B1 | * | 5/2002 | Matsuzawa et al. | 370/395.31 |
| 6,400,729 B1 | * | 6/2002 | Shimadoi et al. | 370/466 |
| 6,473,421 B1 | * | 10/2002 | Tappan | 370/351 |
| 6,501,754 B1 | * | 12/2002 | Ohba et al. | 370/389 |
| 2003/0123448 A1 | * | 7/2003 | Chang | 370/395.1 |

OTHER PUBLICATIONS

Loukola, "Data Link Level Forwarding For IPv6 Packets On ATM Links", Nov. 20, 1997, Helsinki University of Technology, pp. 30–33.*

* cited by examiner

Primary Examiner—Kwang Bin Yao
(74) Attorney, Agent, or Firm—Dickstein, Shapiro, Morin & Oshinsky, LLP.

(57) ABSTRACT

The protocol repeat/conversion library 13 and the protocol repeat/conversion program 24 exchange inner information between each other in order to establish a virtual connection. The protocol repeat/conversion library 13 sends a logical host address name determined independently of the receiver protocol. The protocol repeat/conversion program 24 resolves the receiver address determined dependently of the receiver protocol and stores the receiver address to the address conversion table 242 with a index number related to the receiver address. The index number indicates one line in the address conversion table 132 and 242. The protocol repeat/conversion library 13 receives the index number. After all, the index number is applied for establishing a virtual connection between the sending terminal 1 and the receiving terminal 3.

8 Claims, 3 Drawing Sheets

METHOD AND SYSTEM OF COMMUNICATING BY ESTABLISHING ONE VIRTUAL CONNECTION BETWEEN TERMINALS, A TERMINAL DEVICE, AND A PROTOCOL REPEATER/CONVERTER

BACKGROUND OF THE INVENTION

This invention relates to a protocol repeat/conversion system in particular, to a method and device of protocol repeat/conversion.

Conventional system of protocol repeat/conversion provides a mechanism that two terminal devices communicate each other via one virtual connection. An example of the conventional system is shown in RFC (request for comments) 1928.

In the protocol repeat/conversion system shown in RFC 1928, a protocol repeater/converter connected to each of two terminals repeats and converts transmitted data in the two connections, and then, the two terminals communicate each other.

In this system, the terminals recognize the two connections via the protocol repeater/converter as one virtual connection. To do so, a library for realizing API (application programming interface) is replaced to a library provided by the system. The provided library, namely a protocol repeat/conversion library, farther comprises functions for repeating and converting one protocol. The API of a communication application executed on the terminals is not modified. The protocol repeat/conversion library exchanges information to the protocol repeater/converter, and consequently, the system provides a framework for making two connections via the protocol repeater/converter look as one virtual connection by the terminals.

In the conventional protocol repeat/conversion system, only one type of protocol is supposed for exchanging information between the protocol repeater/converter and the protocol repeat/conversion library of the terminals. As a result, the protocol repeater/converter of the conventional system is unavailable for two terminals communicating by different protocols each other.

Further, the information transmitted between the conventional protocol repeater/converter and the terminals is not index information that directly indicates to the inner process for the receive terminal. As a result, the information exchanged by the conventional protocol repeater/converter should be converted again to the index information for the inner process. Consequently, the conventional protocol repeater/converter inefficiently converts information.

SUMMARY OF THE INVENTION

It is an object of this invention to provide a method, an apparatus and a recording medium for efficient protocol repeat/conversion.

It is another object of this invention to provide a method, an apparatus, and a recording medium for a protocol repeat/conversion to establish one virtual connection between two terminals. The terminals are operable in accordance with different protocols each other.

According to an aspect of this invention, it is provided that a method of communicating between a sending terminal and a receiving terminal via a protocol repeater/converter by establishing a virtual connection between the sending and the receiving terminals, the sending terminal being operable in accordance with a first protocol while the receiving terminal is operable in accordance with a second protocol different from the first protocol and has an receiver address according to the second protocol, comprising the steps of: (1) inputting to the sending terminal a logical host address name determined independently of the second protocol; (2) receiving, by the protocol repeater/converter, the logical host address name to generate an index for designating an receiver address defined in accordance with the second protocol: (3) recording, in the protocol repeater/converter, a relationship between the receiver address and the index; (4) sending the index back to the sending terminal from the protocol repeater/converter; (5) recording, by the sending terminal, the relationship; and (6) establishing, by the protocol repeater/converter, the virtual connection between the sending terminal and the receiving terminal with reference to the index.

In this method, each of the recording steps, (3) and (5) in the protocol/converter and the sending terminal may comprise the steps of: further recording the logical host address name together with the receiver address and the index as the relationship in the form of a table which has a plurality of lines; and designating one line of the table specified by the index. Further, The index may be represented by a selected one of a mathematically transformed value and a random number. And further, the recording step (5) in the sending terminal may comprise the steps of: preparing a socket API (application programming interface); generating, in the socket API, the logical host address name; preparing a protocol repeat/conversion library which includes the table; and recording the logical host address name in the table included in the protocol repeat/conversion library. In this case, the establishing step (6) comprises the steps of: preparing a protocol repeat/conversion program for accessing the table; and establishing the virtual connection with reference to the protocol repeat/conversion program.

According to another aspect of this invention, it is provided that a system for use in communicating between a sending terminal and a receiving terminal via a protocol repeater/converter by establishing a virtual connection between the sending and the receiving terminals, the sending terminal being operable in accordance with a first protocol while the receiving terminal is operable in accordance with a second protocol different from the first protocol and has an receiver address according to the second protocol, wherein: the sending terminal comprises: means for accepting a logical host address name independent of the second protocol; means for sending the logical host address name to the protocol repeater/converter; means for receiving an index related to the receiver address from the protocol repeater/converter; recording means for recording a relationship between the receiver address and the index; and means for sending the index for designating the receiver address to the protocol repeater/converter; the protocol repeater/converter comprising: means for receiving logical host address name from the sending terminal; means for resolving the receiver address from the logical host address name; means for generating the index related to the receiver address; recording means for recording the relationship between the receiver address and the index; means for sending the index back to the sending terminal; means for receiving the index from the sending terminal; and means for establishing the virtual connection between the sending terminal and the receiving terminal with reference to the relationship.

In this system, each of the recording means in the sending terminal and the protocol repeater/converter may comprise: means for recording the logical host address name together with the receiver address and the index as the relationship in the form of a table which has a plurality of lines; and means for designating one line of the table specified by the index. Further, the index is represented by a selected one of a mathematically transformed value and a random number. And further, the sending terminal may comprise: storage for a socket API (application programming interface); means for generating the logical host address name according to the socket API; storage for a protocol repeat/conversion library which includes the table; and means for recording the logical host address name in the table including in the protocol repeat/conversion library; the protocol repeater/converter comprising: storage for a protocol repeat/conversion program which accesses the table; and means for establishing the virtual connection according to the protocol repeat/conversion program.

According to another aspect of this invention, a sending terminal and a protocol repeater/converter below is provided. The sending terminal for use in communication to a receiving terminal via a protocol repeater/converter by establishing a virtual connection between the sending and the receiving terminals, the sending terminal being operable in accordance with a first protocol while the receiving terminal is operable in accordance with a second protocol different from the first protocol and has an receiver address according to the second protocol, comprises: means for accepting a logical host address name determined independently of the second protocol; means for sending the logical host address name to the protocol repeater/converter; means for receiving an index related to the receiver address from the protocol repeater/converter; means for recording a relationship between the receiver address and the index; and means for sending the index for designating the receiver address to the protocol repeater/converter. The protocol repeater/converter for use in communicating between a sending terminal and a receiving terminal via the protocol repeater/converter by establishing a virtual connection between the sending and the receiving terminals, the sending terminal being operable in accordance with a first protocol while the receiving terminal is operable in accordance with a second protocol different from the first protocol and has an receiver address according to the second protocol, comprises: means for receiving from the sending terminal a logical host address name generated by the sending terminal independent of the second protocol; means for resolving the receiver address from the logical host address name; means for generating an index related to the receiver address; means for recording the relationship between the receiver address and the index; means for sending the index back to the sending terminal; means for receiving the index from the sending terminal; and means for establishing the virtual connection between the sending terminal and the receiving terminal with reference to the relationship.

In this invention, concretely, information independent of a receiver protocol is exchanged in order to establish one virtual connection. With reference to the FIGS. 1 and 2, the sending terminal (1) comprises the protocol repeat/conversion library (13) which executes conversion process and exchanges information for the protocol repeater/converter (2) in order to establish one virtual connection for the communication application (15). The protocol repeater/converter (15) executes a protocol repeat/conversion program (24) which exchanges information for the protocol repeat/conversion library (13) and repeats/converts data streams through the two real connections. The protocol repeater/converter (15) also comprises sender and receiver protocol implementation (22, 23) each of which corresponds the protocol implementation 12 or 32. The protocol repeat/conversion library (13) and the protocol repeat/conversion program (24) exchanges each other their inner information in order to establish a virtual correction. To repeat and convert information between two terminals with different protocol implementations each other, this invention prepares address conversion table (132, 242) storing relationships of address information in the two connections. The address conversion tables (132, 242) further stores index numbers each of which indicates one relationship of address information. In this invention, two terminals operable in accordance with different protocols each other exchange the index number and consequently repeat/convert between two protocols.

To establish one virtual connection between a sending and receiving terminals via a protocol repeater/converter, the sending terminals and the protocol repeater/converter exchange their inner information. The sending terminal requests the protocol repeater/converter to resolve the address of the receiving terminal in the receiver protocol (receiver address) from a logical host address name determined independently of the receiver protocol. After resolving the receiver address, the protocol repeater/converter relates the receiver address to the logical host address name and stores their relationship with a index. After receiving the index, by sending the index to the protocol repeater/converter, the sending terminal communicates to the receiving terminal via the protocol repeat/converter with establishing a virtual connection.

DESCRIPTION OF THE PREFERRED EMBODIMENTS

Next, description will be made about preferred embodiments of this invention.

Figure 1:
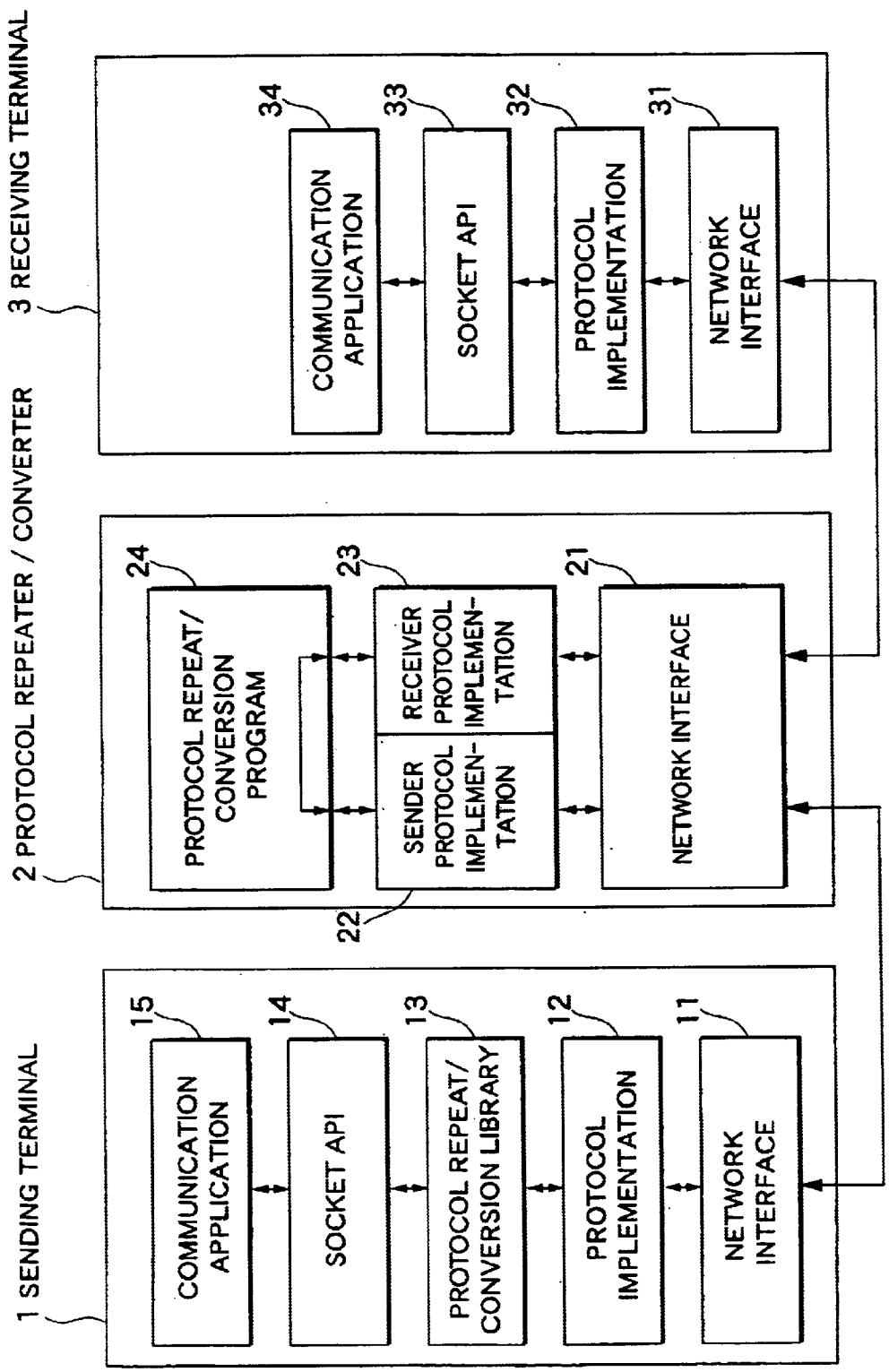
FIG. 1 shows a block diagram for use in describing an embodiment of this invention.

With reference to FIG. 1, first embodiment will be described below. The first embodiment comprises a sending terminal 1, a protocol repeater/converter 2, and a receiving terminal 3. The sending terminal 1 transmits information to the receiving terminal 3 via the protocol repeater/converter 2. The protocol repeater/converter 3 has two connections each of which is connected to the sending terminal 1 or the receiving terminal 3. The protocol of the sending terminal 1 and that of the receiving terminal 3 are different. The protocol repeater/converter 3 repeats and converts between the two protocols in order to establish one virtual connection from the two connections.

The sending terminal 1 comprises a network interface 11, a protocol implementation 12, protocol repeat/conversion library 13, socket API (application programming interface) 14, and a communication application 15.

The network interface 11 materializes physical communication. The protocol implementation 12 is substance of a protocol (e.g. TCP/IP) of the sending terminal 1. The protocol repeat/conversion library 13 is a peculiar part of this embodiment. The library 13 inside exchanges information to a protocol repeat/conversion program 24 in the protocol repeater/converter 2 in order to establish a virtual connection. The library 13 is implemented as a partial replacement of the socket API 14. The socket API 14 provides an API of a communication socket for the communication application 15. The communication application 15 is a general communication application that doesn't take repeat of two connections into consideration.

The receiving terminal 3 has same components of general terminal. The receiving terminal 3 comprises a network interface 31, a protocol implementation 3, a socket API 33, and a communication application 34.

The network interface 31 materializes physical communication. The protocol implementation 32 is substance or a protocol (e.g. TCP/IP) of the sending terminal 1. The socket API 33 provides an API of a communication socket for the communication application 34. The communication application 34 is a general communication application that doesn't take repeat of two connections into consideration.

The protocol repeater/converter 2 comprises a network interface 21, a sender protocol implementation 22, a receiver protocol implementation 23, a protocol repeat/conversion program 24.

The network interface 21 materializes physical communication. The sender protocol implementation 22 is substance of same protocol implemented on the protocol implementation 12 of the sending terminal 1. The receiver protocol implementation 32 is substance of same protocol implemented on the protocol implementation 32 of the receiving terminal 3. The protocol repeat/conversion program 24 is another peculiar part of this embodiment. The program 24 exchanges information to the protocol repeat/conversion library 13 in order to establish a virtual connection. Further, the program 24 repeats and converts between two connections.

Figure 2:
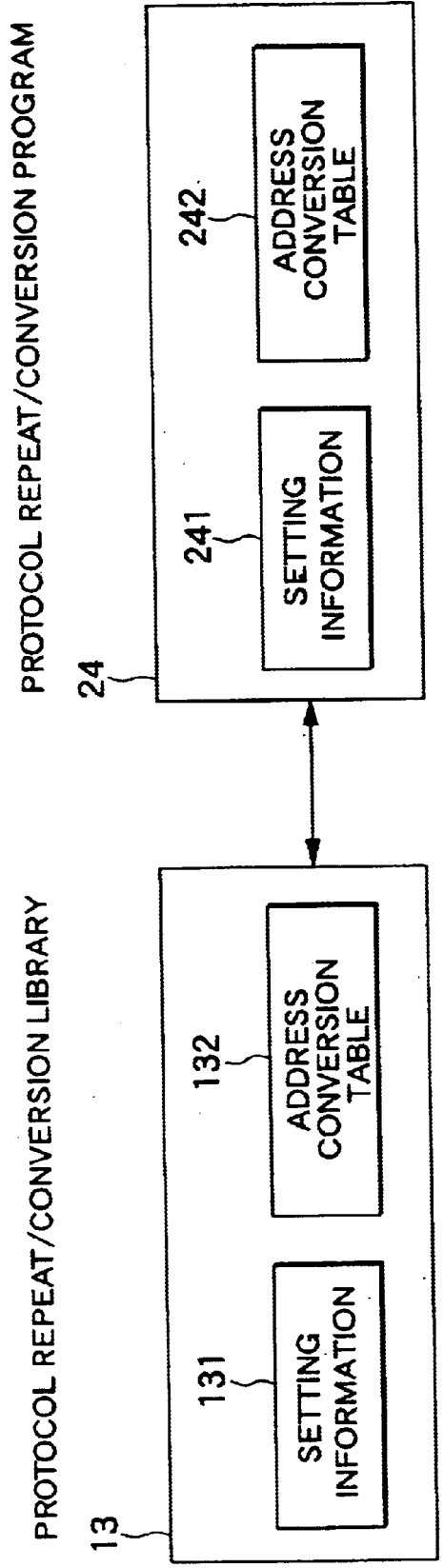
FIG. 2 shows a block diagram for use in describing the protocol repeat/conversion library 13 and protocol repeat/conversion program 24.

With reference to FIG. 2, the protocol repeat/conversion library 13 comprises setting information area 131 and an address conversion table 132. The protocol repeat/conversion program 24 comprises setting information area 241 and an address conversion table 242.

The setting information area 131 stores setting information for establishing a connection, for example location information of the protocol repeater/converter 2. The address conversion table 132 stores inquiry results of address-to-address relationships described later. The setting information area 241 stores setting information about terminals acceptable to repeat requests to the protocol repeater/converter 2. The address conversion table 242 stores inquiry results of the address-to-address relationship.

Next, we will describe converting protocol by the embodiment mentioned above. The communication application 15 in the sending terminal 1 communicates to the receiving terminal 3 through one virtual connection. The virtual connection is established by exchanging inner information which is closed without the sending terminal 1 and the protocol repeater/converter 3.

To establish the virtual connection, the communication application 15 notices a logical host address name to the protocol repeat/conversion library 13 via the socket API 14. The logical host address name is determined independently of the protocol of the receiving terminal 3. A general socket API implements a function for converting information between a communication application and a system program. The function converts a logical host address name to an address depending on a protocol of the terminal. However, the function of the socket API 14 is replaced to a function of the protocol repeat/conversion library 13. The function of the protocol repeat/conversion library 13 is actually realized by exchanging information between the protocol repeat/conversion library 13 and the protocol repeat/conversion program 24. For exchanging information, address information of the protocol repeater/converter 2 is necessary. This address information is stored in the setting information area 131. With reference to the setting information area 131, the protocol repeat/conversion library 13 exchanges inner information to the protocol repeat/conversion program 24.

Figure 3:
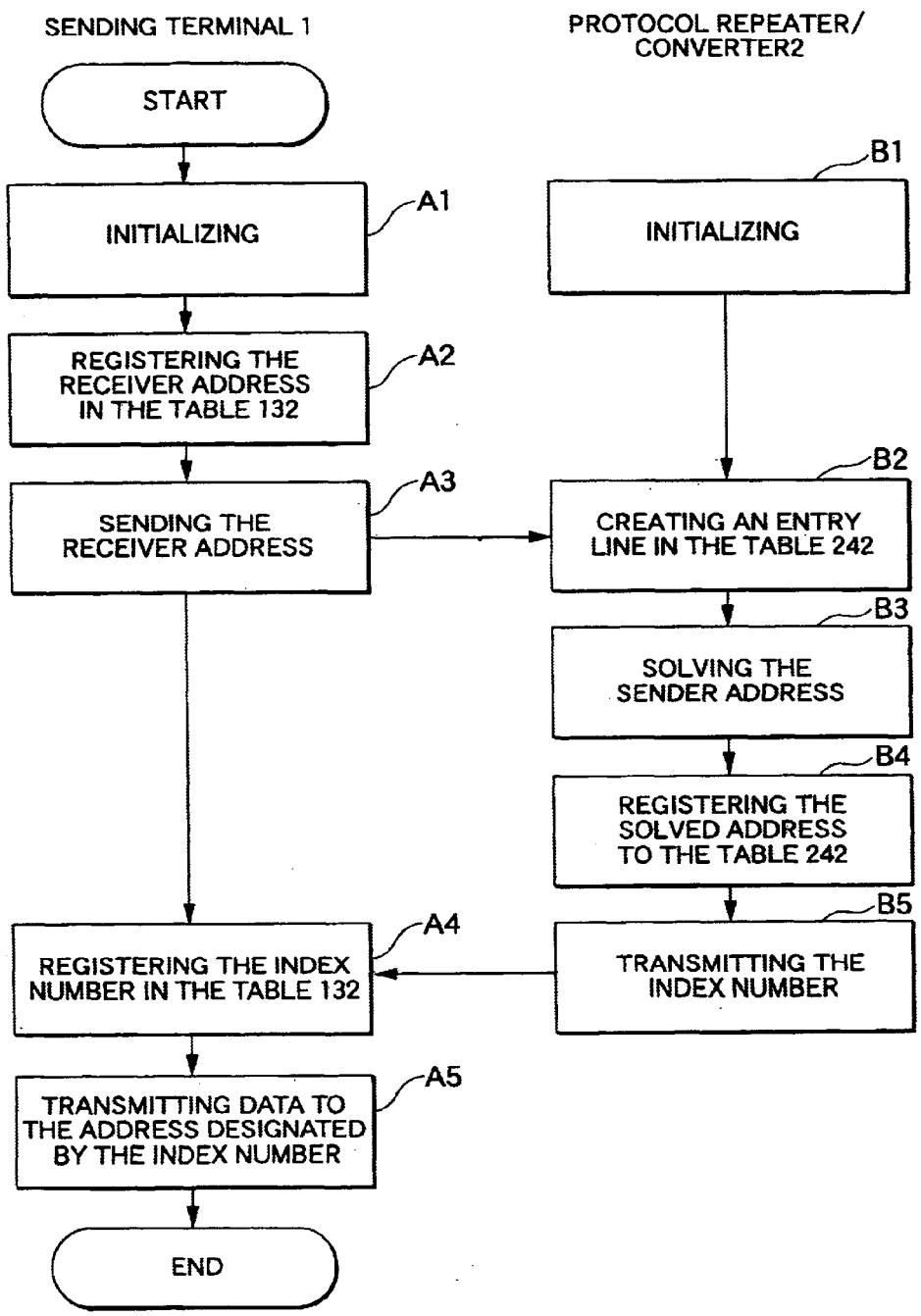
FIG. 3 shows a flow chart of the embodiment shown in FIGS. 1 and 2.

Further, detailed description will be made about above-mentioned exchange of inner information between the protocol repeat/conversion library 13 and the protocol repeat/conversion program 24 with reference to FIG. 3.

Before starting communication, address information of the protocol repeater/converter is given to the sending terminal as a form of a setting file et al. At initializing process, the setting file is read to the setting information area 131 (STEP A1).

When the protocol repeat/conversion library 13 receives a logical host address name, which is independent of the protocol implemented to the receiving terminal 3, from the socket API, the library 13 registers the logical host address name to the address conversion table 132 as an address of a receiver (STEP A2). Further, the library 13 sends the logical host address name to the protocol repeat/conversion program 24 (STEP A3).

At the receiving of the logical host address name, the protocol repeat/conversion program 24 venerates a new entry line in the address conversion table 242 and registers the logical host address name to the new entry line(STEP B2). Next, the program 24 computes an address of the receiver terminal from the logical host address name by what is known as address resolution (STEP B3). And next, the program 24 registers the resolved address, namely a receiver address depending on the protocol of the receiving terminal 3, to the new entry line in the address conversion table 242 (STEP B4).

When the protocol of the sending terminal 1 is different from that of the receiving terminal 3, the sending terminal 1 is unable to interpret the resolved address at STEP B4. Therefore, the protocol repeat/conversion program 24 doesn't sends the resolved address back to the protocol repeat/conversion table 13. Instead of the resoled address, the protocol repeat/conversion program 24 sends an line number, which is given in serial order and indicates one line of the address conversion table 242 (STEP B5). In this embodiment, the line number corresponds to an index number in claims and figures.

At the receiving the line number from the protocol repeat/conversion program 24, the protocol repeat/conversion library 13 resisters the line number to the address conversion table 132 (STEP A4). The logical host address name has been related to the receiver address via the line number between the sending terminal 1 and the protocol repeater/converter 2.

After finishing STEP A4, the protocol repeat/conversion library 13 sends the line number back to the protocol repeat/conversion program 24 instead of the logical host address name in order to communicate the receiver terminal 3 (STEP A5). Consequently, a virtual connection is established between the sending terminal 1 and the receiving terminal 3.

As mentioned above, after establishing a virtual connection, the protocol repeat/conversion library 13 sends data with an line number related to one specific connection to the protocol repeat/conversion program 24. The program 24 computes the address of the receiving terminal 3 by applying the line number as a key in the address conversion table 242 in order to repeat and convert a protocol of data.

Next, description will be made about another embodiment of this invention. In the first embodiment mentioned above, a line number is transmitted as an index number between the protocol repeat/conversion library 13 and the protocol repeat/conversion program 24. In this case, line numbers are able to be expected because line numbers are natural numbers and increases by one. Further, it is possible that a line number is incorrectly indicated and the incorrect number coincides with another line number.

In the second embodiment, the protocol repeat/conversion program 24 sends a mathematically transformed value as an index number, instead of the line number. In the second embodiment, in addition to the first embodiment, the protocol repeat/conversion program 24 further executes mathematically transformation to the line number and sends back to the protocol repeat/conversion library 13 as an index number. On the other hand, the protocol repeat/conversion library 13 executes the inverse transformation to the index number.

Next, the third embodiment of this invention is described below. To avid expectation and accidental coincidence of the index number, the third embodiment generates a unique random number and relates the random number to the line number. The relationship between the random and line number is managed in the address conversion table 242 and is exchanged between the protocol repeat/conversion program 24 and the protocol repeat/conversion library 13. In other words, in addition to the first embodiment, the third embodiment further comprises a function for generating a unique random number, a function for registering the random number in relation to the corresponding line number, and a function for interpreting the random number to the line number.

In the above-mentioned embodiments, the communication application 15 may directly use the logical host address name determined independently of the receiver protocol via the socket API 14.

Furthermore, the communication application 15 may communicate by a pseud address after establishing a virtual connection. The pseud address is related to a logical host address name and determined independently of the receiver protocol. After receiving a logical host address name from the communication application 15, the socket API 14 sends the logical host address name to the protocol repeat/conversion library 13 and sends the pseud address to the communication application 15.

As mentioned above, information dependent on the receiver protocol is stored in the protocol repeater/converter. The protocol repeater/converter stores information dependent on the receiver protocol and establishes a virtual connection between the sending and receiving terminals. Consequently, this invention can repeat and convert protocols by establishing a virtual connection between a sending and receiving terminals.

Furthermore, before communicating to the receiver terminal, the sending terminal request address resolution of the receiver address to the protocol repeater/converter. The sending terminal receives the result of the address resolution as an index number which indicates a specific line in the address conversion table. The protocol repeater/converter interprets the index number to the receiver address with reference to the address conversion table. Consequently, the protocol repeater/converter efficiently repeats and converts protocols.

While this invention has thus far been described in conjunction with a few embodiments thereof, it will be readily possible for those skilled in the art to put the this invention into various other manners.

What is claimed is:

1. A method of communicating between a sending terminal and a receiving terminal via a protocol repeater/converter by establishing a virtual connection between the sending and the receiving terminals, the sending terminal being operable in accordance with a first protocol and the receiving terminal being operable in accordance with a second protocol different from the first protocol, the receiving terminal having a receiver address in accordance with the second protocol, the method comprising:

inputting to the sending terminal a logical host address name determined independently of the second protocol;

receiving, by the protocol repeater/converter, the logical host address name and generating an index designating a receiver address defined in accordance with the second protocol;

recording, in the protocol repeater/converter, a relationship between the receiver address and the index;

sending the index back to the sending terminal from the protocol repeater/converter;

recording, by the sending terminal, the relationship; and establishing, by the protocol repeater/converter, the virtual connection between the sending terminal and the receiving terminal with reference to the index, wherein:

the recording step in the protocol/converter and the recording step in the sending terminal each further comprises:

recording the logical host address name together with the receiver address and the index as the relationship in a form of a table which has a plurality of lines; and designating one line of the table specified by the index.

2. The method of claim 1, wherein the index is represented by a selected one of a mathematically transformed value and a random number.

3. The method of claim 1, wherein:

the recording step in the sending terminal further comprises:

preparing a socket API (application programming interface);

generating, in the socket API, the logical host address name;

preparing a protocol repeat/conversion library which includes the table; and recording the logical host address name in the table included in the protocol repeat/conversion library; and the establishing step further comprises:

preparing a protocol repeat/conversion program for accessing the table; and establishing the virtual connection with reference to the protocol repeat/conversion program.

4. A system for use in communicating between a sending terminal and a receiving terminal via a protocol repeater/converter by establishing a virtual connection between the sending and the receiving terminals, the sending terminal being operable in accordance with a first protocol and the receiving terminal being operable in accordance with a second protocol different from the first protocol, the receiving terminal having a receiver address in accordance with the second protocol, the sending terminal comprising:

means for accepting a logical host address name independent of the second protocol;

means for sending the logical host address name to the protocol repeater/converter;

means for receiving an index related to the receiver address from the protocol repeater/converter;

recording means for recording a relationship between the receiver address and the index; and means for sending the index designating the receiver address to the protocol repeater/converter; and the protocol repeater/converter comprising:

means for receiving the logical host address name from the sending terminal;

means for resolving the receiver address from the logical host address name;

means for generating the index related to the receiver address;

recording means for recording the relationship between the receiver address and the index;

means for sending the index back to the sending terminal;

means for receiving the index from the sending terminal; and means for establishing the virtual connection between the sending terminal and the receiving terminal with reference to the relationship, wherein each of the recording means in the sending terminal and the protocol repeater/converter further comprises:

means for recording the logical host address name together with the receiver address and the index as the relationship in a form of a table which has a plurality of lines; and means for designating one line of the table specified by the index.

5. The system claim 4, wherein the index is represented by a selected one of a mathematically transformed value and a random number.

6. The system of claim 4, wherein:

the sending terminal comprises:

storage for a socket API (application programming interface); means for generating the logical host address name according to the socket API;

storage for a protocol repeat/conversion library which includes the table; and means for recording the logical host address name in the table included in the protocol repeat/conversion library; and the protocol repeater/converter comprises:

storage for a protocol repeat/conversion program which accesses the table; and means for establishing the virtual connection according to the protocol repeat/conversion program.

7. A sending terminal for use in communicating to a receiving terminal via a protocol repeater/converter by establishing a virtual connection between the sending and the receiving terminals, the sending terminal being operable in accordance with a first protocol and the receiving terminal being operable in accordance with a second protocol different from the first protocol, the receiving terminal having a receiver address in accordance with the second protocol, the sending terminal comprising:

means for accepting a logical host address name determined independently of the second protocol;

means for sending the logical host address name to the protocol repeater/converter;

means for receiving an index related to the receiver address from the protocol repeater/converter;

means for recording a relationship between the receiver address and the index; and means for sending the index for designating the receiver address to the protocol repeater/converter;

means for recording the logical host address name together with the receiver address and the index as the relationship in a form of a table which has a plurality of lines; and means for designating one line of the table specified by the index.

8. A protocol repeater/converter for use in communicating between a sending terminal and a receiving terminal via the protocol repeater/converter by establishing a virtual connection between the sending and the receiving terminals, the sending terminal being operable in accordance with a first protocol and the receiving terminal being operable in accordance with a second protocol different from the first protocol, the receiving terminal having a receiver address according to the second protocol, the protocol repeater/converter comprising:

means for receiving from the sending terminal a logical host address name generated by the sending terminal independent of the second protocol;

means for resolving the receiver address from the logical host address name;

means for generating an index related to the receiver address; means for recording the relationship between the receiver address and the index;

means for sending the index back to the sending terminal;

means for receiving the index from the sending terminal;

means for establishing the virtual connection between the sending terminal and the receiving terminal with reference to the relationship;

recording means for recording the logical host address name together with the receiver address and the index as the relationship in a form of a table which has a plurality of lines; and means for designating one line of the table specified by the index.

* * * * *